(No Model.)
R. E. PAPENDICK.
FITTING PULLEYS TO SHAFTS.
No. 454,916. Patented June 30, 1891.
FIG=1-
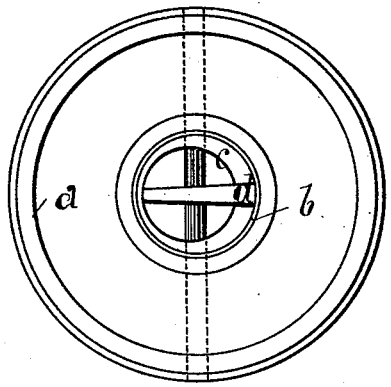
FIG=2-
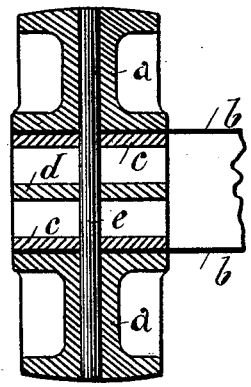
FIG=3-
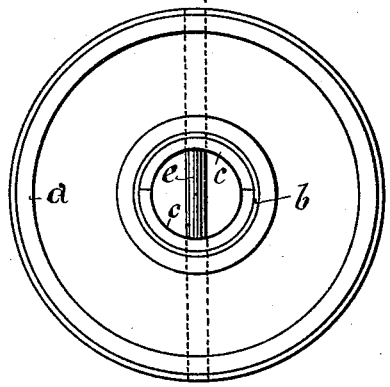
FIG=4-
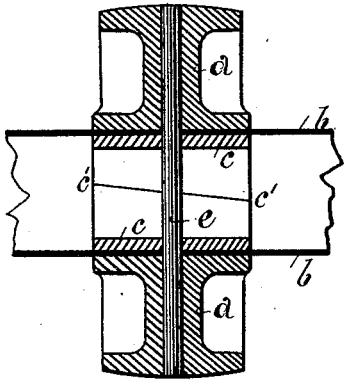
FIG=5-
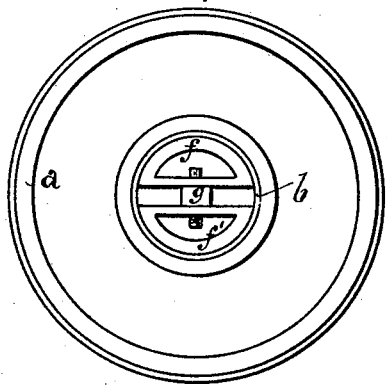
FIG=6-
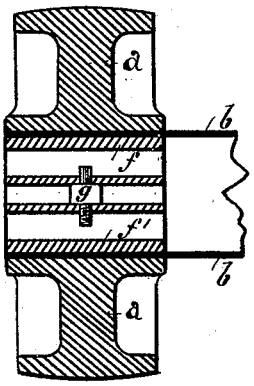
Witnesses:
Wilhelm Hirst.
Theodor Steidel.
Inventor:
Richard Eugen Papendick
per Gerson and Sachse
his Attorneys.

UNITED STATES PATENT OFFICE.

RICHARD E. PAPENDICK, OF OFFENBACH-ON-THE-MAIN, GERMANY.

FITTING PULLEYS TO SHAFTS.

SPECIFICATION forming part of Letters Patent No. 454,916, dated June 30, 1891.

Application filed August 19, 1890. Serial No. 362,454. (No model.) Patented in England March 7, 1890, No. 3,665.

*To all whom it may concern:*

Be it known that I, RICHARD EUGEN PAPENDICK, a subject of the Emperor of Germany, residing at Offenbach-on-the-Main, in the Empire of Germany, have invented certain new and useful improvements in fitting driving-pulleys to tubular shafts and in coupling or uniting tubing, shafting, and analogous articles, (for which I have obtained a patent in Great Britain, No. 3,665, bearing date March 7, 1890,) of which the following is a specification.

My invention relates to a new method of and means for fitting driving-pulleys to tubular shafts and in coupling or uniting parts of machinery by means of tubes expanded or wedged in position, and its object is to supersede the ordinary methods of and means for brazing as now practiced for such purposes; and in order that my said invention may be better understood and ascertained reference is hereby made to the accompanying drawings, in which similar letters of reference indicate corresponding parts.

Figure 1 is an end view, and Fig. 2 a longitudinal section showing one means for carrying out my invention. Figs. 3 and 5 are end views, and Figs. 4 and 6 are the respective longitudinal sections showing other means for carrying out my invention.

Referring to Figs. 1 and 2, $a$ is a ring or casting, such as the boss of a pulley.

$b$ is a tube, (or tubular shaft,) to which the ring $a$ is required to be united.

$c$ is a split ring eccentrically bored, and $d$ is a wedge, which is driven in between the split portions of the ring $c$, whereby it and the tube (or shaft) $b$ are expanded together, and the tube or shaft $b$ is caused to fit the ring $a$ forcibly. The wedge $d$ may be further secured in position by a pin $e$; but this pin may be dispensed with.

In Figs. 3 and 4 the inner ring is shown split in two, the edges being inclined from $c'$ to $c'$, whereby the two parts can be driven toward each other longitudinally, thus expanding the tube or shaft $b$ or two tubes or shafts $b\,b$ in the ring or boss $a$. A pin $e$ or pins $e\,e$ may be used to secure the position of the split ring $c$.

In Figs. 5 and 6 the expansion of the tube $b$ is effected by the two segments $f\,f'$, which are inserted in the tube $b$. $g$ is a screw having a square boss with a pin-head entering the segment $f$ and a screw-thread tapped into the segment $f'$, whereby the segments may be forced asunder with the aid of a spanner applied to the screw $g$.

It is obvious that various modifications may be made in the relative thickness of the metal and the means for inserting and driving the wedges and screws.

Having now particularly described and ascertained the nature of my said invention and in what manner the same is to be performed, I declare that what I claim is—

1. The method of securing a pulley to a tubular shaft, which consists in placing the pulley on the shaft, inserting in said tubular shaft an extensible ring, and in then causing said ring to expand and force the sides of said tubular shaft into contact with the hub of the pulley, substantially as set forth.

2. In combination with the tubular shaft $b$ and the boss $a$ of a pulley, the split ring and the wedge $d$, as specified.

RICH. E. PAPENDICK.

Witnesses:
ALVESTO S. HOGUE,
JEAN GRUND.